Figure 1:
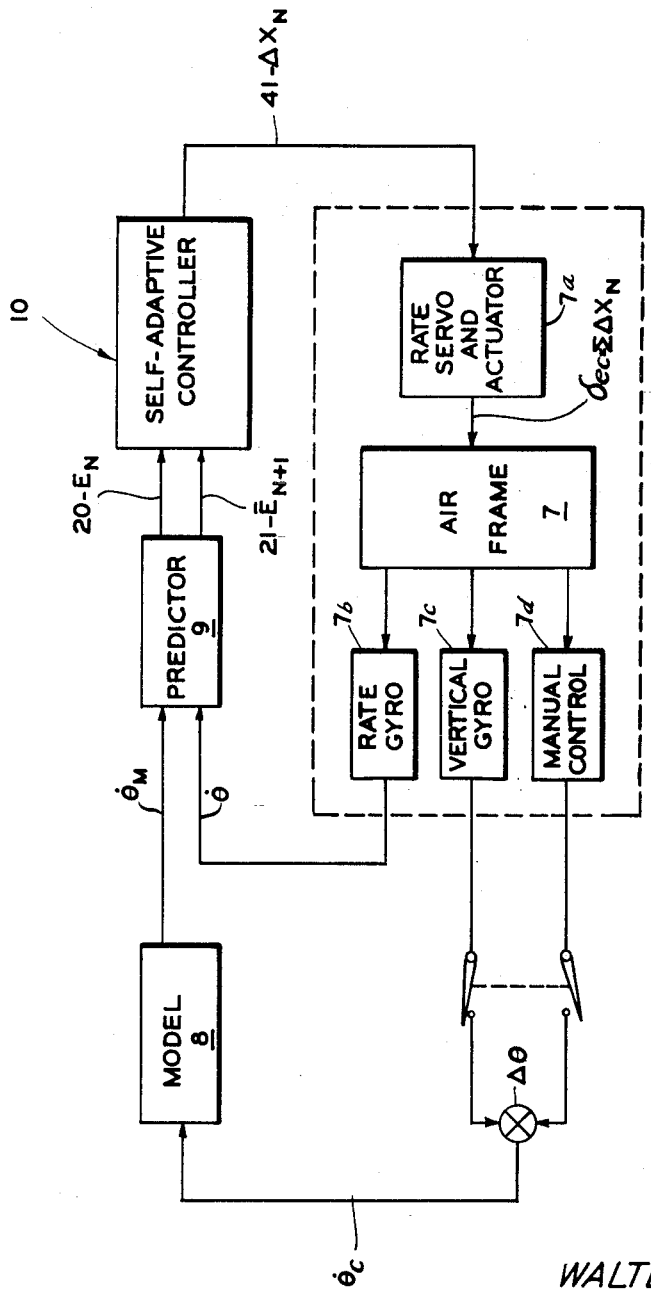

INVENTORS -
WALTER A. PLATT
ARNOLD UNGER
JOHN G. MC GOUGH
GEORGE H. PFERSCH, JR.
BY Charles J. Worth
AGENT -

Jan. 18, 1966 W. A. PLATT ETAL 3,230,351
SELF-ADAPTIVE CONTROL SYSTEM
Filed Sept. 14, 1960 5 Sheets-Sheet 5

| PULSE TP | FLIP FLOP | | | VALUE $K_d$ |
|---|---|---|---|---|
| | FF3 | FF4 | FF5 | |
| — | 0 | 0 | 0 | 1.000 |
| 1 | 1 | 0 | 0 | .616 |
| 2 | 0 | 1 | 0 | .380 |
| 3 | 1 | 1 | 0 | .232 |
| 4 | 0 | 0 | 1 | .146 |
| 5 | 1 | 0 | 1 | .089 |
| 6 | 0 | 1 | 1 | .055 |
| 7 | 1 | 1 | 1 | .000 |

-INVENTORS-
WALTER A. PLATT
ARNOLD UNGER
JOHN G. MC GOUGH
GEORGE H. PFERSCH JR.
BY Charles J. Worth
-AGENT- 3,230,351
Patented Jan. 18, 1966

3,230,351
SELF-ADAPTIVE CONTROL SYSTEM
Walter A. Platt, Paterson, John G. McGough, East Paterson, Arnold Unger, Totowa, and George H. Pfersch, Jr., West Orange, N.J., assignors to The Bendix Corporation, Teterboro, N.J., a corporation of Delaware
Filed Sept. 14, 1960, Ser. No. 56,033
17 Claims. (Cl. 235—151)

This invention relates generally to self-adaptive control systems for vehicles capable of flight and more specifically to systems including sample data controllers for providing signals to the controls of such vehicles.

A self-adaptive control system is particularly adaptable to vehicles which operate both in the earth's atmosphere and outer space, and encounter conditions of extremely high and negligibly small aerodynamic and accelerating forces. The usual control system design criteria applicable to vehicles capable of flight within the earth's atmosphere as well as additional problems peculiar to space vehicles must be considered. Space vehicles encounter a wide range of flight conditions which make it difficult to measure and predict aerodynamic parameters. In addition, they may exhibit a lack of static attitude stability when in non-atmospheric flight. Highly accurate and sensitive controls are required by such craft flying at extreme speeds and distances, and precision is necessary for re-entry into the earth's atmosphere. The system must be capable of manual control under high and low "g" conditions. By applying self-adaptive techniques, the need for air data gain programming, and for accurate information relating to vehicle dynamic characteristics is obviated. The use of self-adaptive methods of flight control provides techniques for obtaining relatively constant transient response throughout a wide range of flight conditions. Although this type of a control system is adapted to control on all axes of the vehicle, only one channel is shown and described but not applied to a specific control direction. It should suffice to say that each control axis of the vehicle requires a channel to provide the specific associated directional control utilizing components common to more than one channel where possible.

An object of this invention is to provide a self-adaptive control system for a vehicle capable of flight within and without the earth's atmosphere under an extremely wide range of flight conditions.

Another object of this invention is to provide the aforementioned control system that has memory devices for retaining sampled data used to derive command increment signals which are applied to rate servos and associated control actuators.

Another object of this invention is to provide the aforementioned control system wherein a controller has a digital type programmer to control a timed, operating-sequence, a digital type computer for periodically deriving the vehicle time response from memorized sampled data, a logic circuit to validate sampled data prior to computer operation, and a novel means for terminating computer operation when the desired information is derived.

This invention contemplates a sampled data self-adaptive control system for providing command increments to the controls of a vehicle to continuously reduce the difference between an actual response and a desired response, comprising means for providing a signal representing the actual error at the time the signal is sampled and a signal representing a predicted error at the following sampling time if no additional command increment is applied to the controls, and a controller adapted to sample and hold the error signals and the command increments. The controller includes means for summing the actual and predicted error signals for the present sampling instant with the command increment applied to the controls immediately preceding the present sampling instant and for reducing the sum to zero to obtain a system gain that provides for the normal response of the vehicle when computing the next command increment.

The foregoing and other objects and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes only and are not to be construed as defining the limits of the invention.

Figure 2:
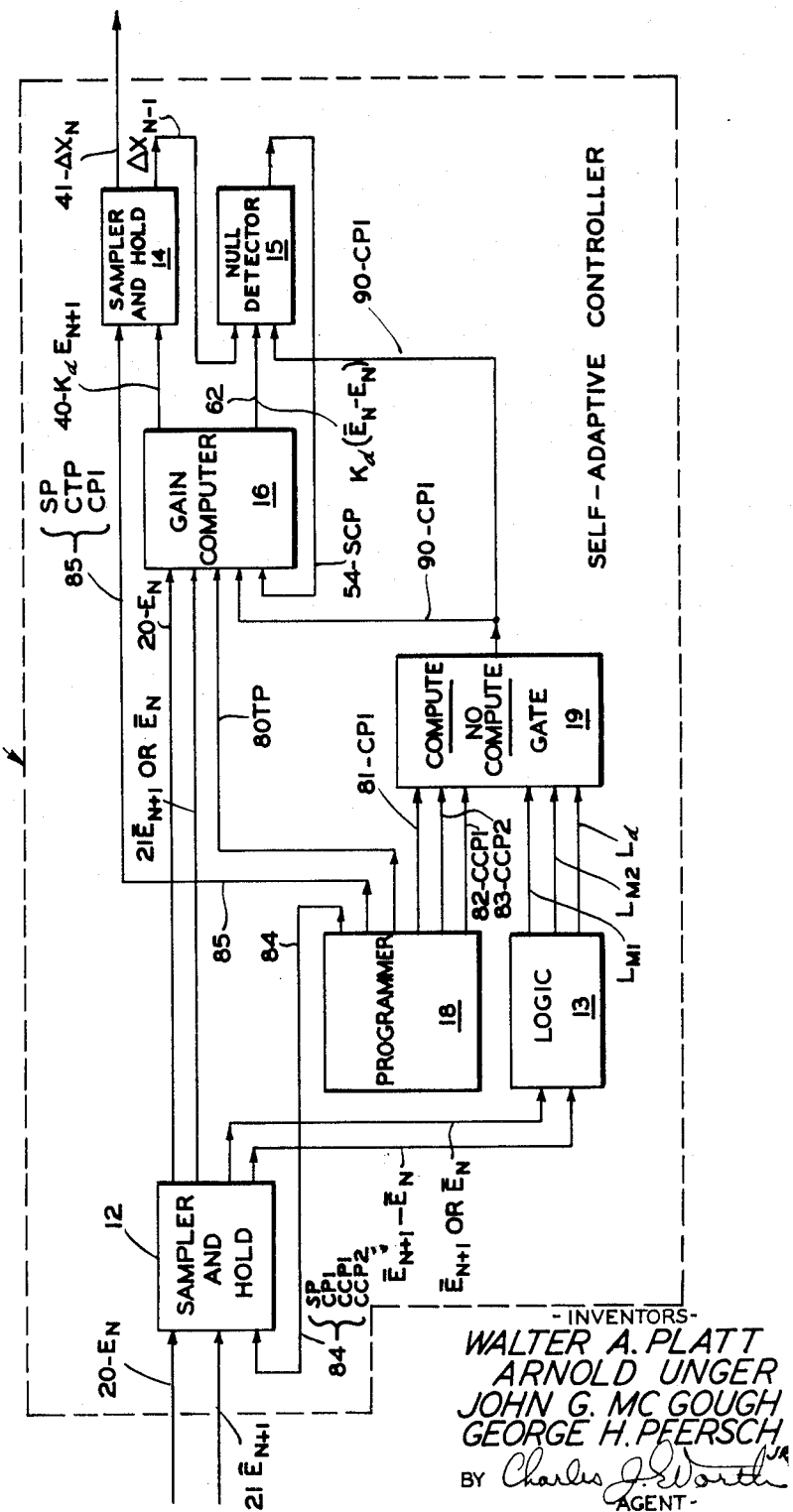
Figure 3:
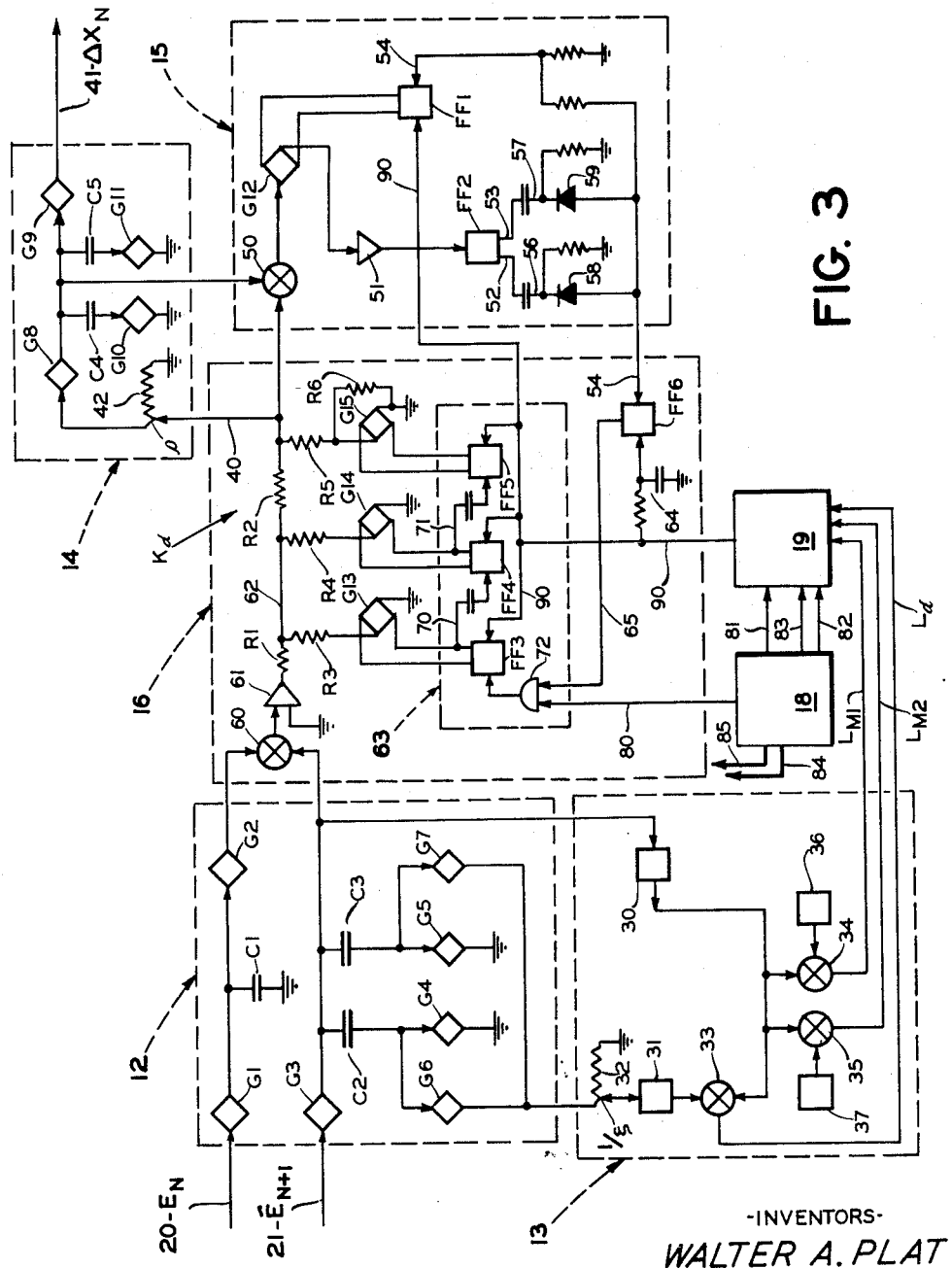
Figure 4:
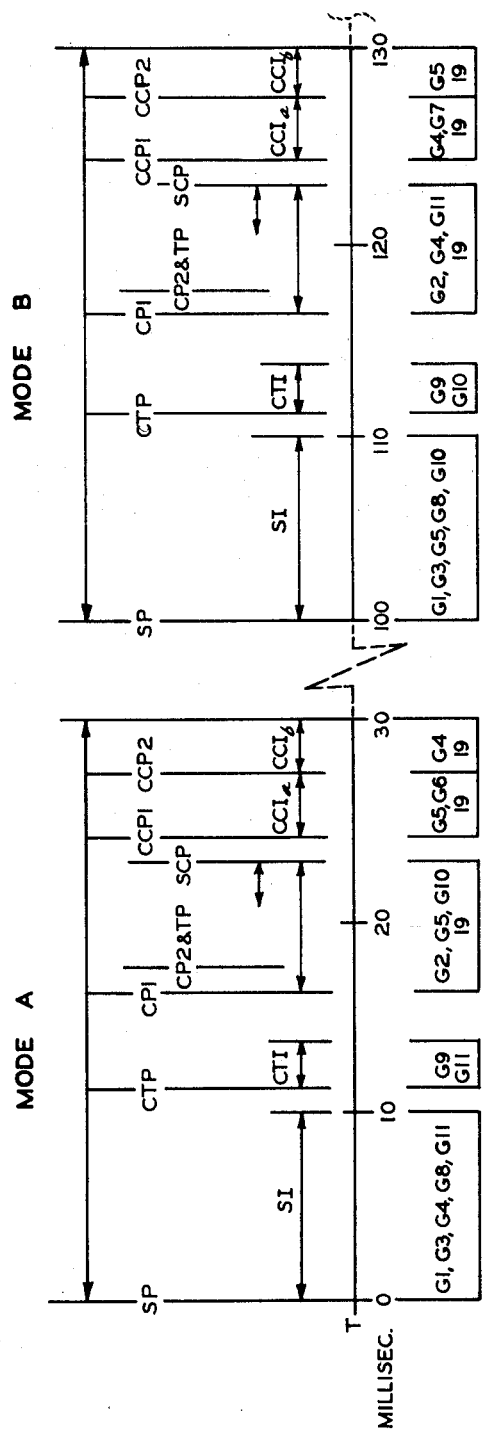
Figures 5, 6:
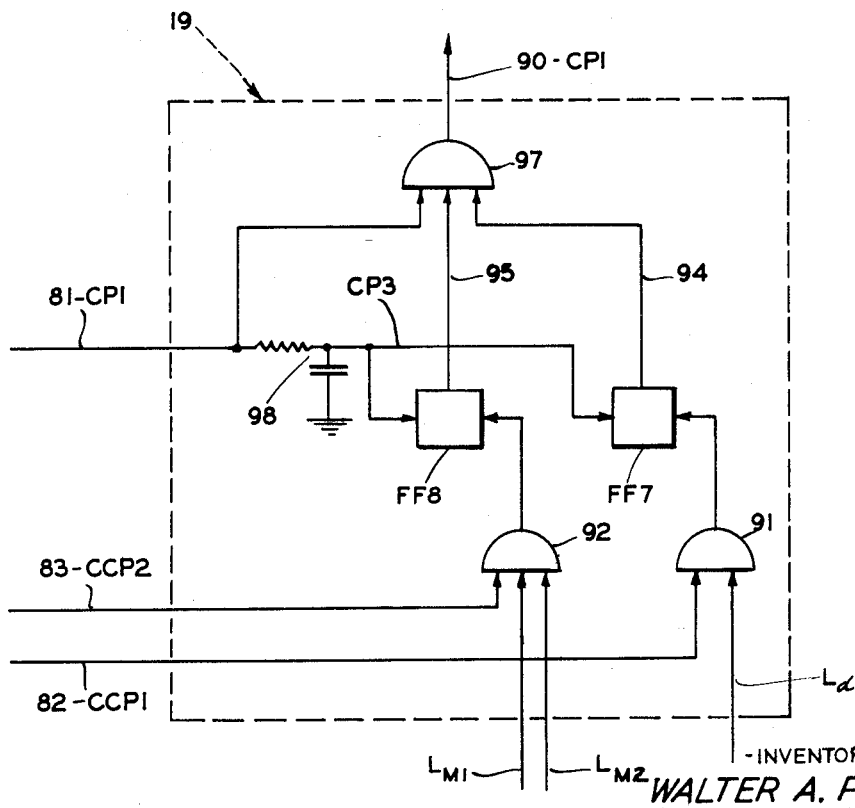

FIGURE 1 is a block diagram of a novel self-adaptive control system including a controller constructed according to the invention, FIGURE 2 is a block diagram of the novel controller of FIGURE 1, FIGURE 3 is a circuit diagram of the controller of FIGURE 2, FIGURE 4 is a sequencing chart of the programmer of FIGURES 2 and 3, FIGURE 5 is a chart identifying the various states of a digital counter and the associated gates to obtain the gain values, and, FIGURE 6 is a circuit diagram of the compute/no compute gate of FIGURES 2 and 3.

Referring now to FIGURE 1, the novel self-adaptive control system shown therein includes a model system 8, a predictor 9 and a self-adaptive controller 10. Actual error signals $E_n$ and predicted error signals $\overline{E}_{n+1}$ are continuously available to the self-adaptive controller 10 which modifies the predicted signals by system gain $K_d$ to derive command increment or incremental input steps $(\Delta X)_n$ which are applied to a rate servo and control actuator 7a at discrete intervals. The object of the controller 10 is to command a control surface deflection $\delta e c$ by the sum $(\Sigma \Delta X)_n$ of the command $(\Delta X)_n$ so the difference (the actual error $E_n$) between the actual and desired response is reduced. The system functions in a manner to provide system response depending primarily on the characteristics of the model 8 and the input command $\theta_c$, and not on the dynamic characteristics of the air frame 7.

The controller 10 recomputes and corrects the system gain $K_d$ by sampling present and past data, as will be further discussed. Each command increment $(\Delta X)_n$ is summed with past incremental input steps, the total command $(\Sigma \Delta X)_n$ determining the total steps response $\delta e c$ of the vehicle controls (not shown). The air frame 7 responds to the total control $\delta e c$ and includes a rate gyro 7b to provide an indicated rate of change of attitude signal $\dot{\theta}$ and a vertical gyro 7c to provide an indicated attitude displacement signal $\Delta \theta$. A manual control 7d or other means may also provide the signal $\Delta \theta$. A command signal $\theta_c$ corresponding to $\Delta \theta$ is applied to the model.

One criterion governing the novel system is to provide a desired vehicle response, such as a desired natural frequency and a specific damping factor. This is specified by the model which derives a desired response signal $\theta_m$ from the commanded signal $\theta_c$. By comparing the desired response signal $\theta_m$ from the model with the rate of change of attitude signal $\dot{\theta}$ from the rate gyro at a time instant $t_n$, the present, the actual present error signal $E_n$ is derived. In addition to the actual error signal $E_n$, the controller 10 requires a predicted error signal $\overline{E}_{n+1}$ representing the prediction at the present time $t_n$ of the error that will exist at the next sampling instant $t_{n+1}$ if no command increment $(\Delta X)_n$ is applied at the time the prediction is made. The operation of the self-adaptive control system and the controller 10 will be more completely understood by first considering the following mathematical derivation of the various parameters in which the sum of the command increments $(\Sigma \Delta X)_n$ denotes the constant value of the commanded control $\delta ec$ existing during a time interval beginning at the $n$th sampling instant and terminating at the next sampling instant "$n+1$," and is symbolized by $t_n \leq t_{n+1}$. Therefore, during an interval $t_{n+m} \leq t < t_{n+m+1}$, the constant value of $\delta ec$ is:

(1) $$(\Sigma \Delta X)_{n+m} = (\Sigma \Delta X)_n + \sum_{j=1}^{m} (\Delta X)_{n+j}$$

where "$j$" is a variable having a value running from 1 to $m$, "$m$" denotes the total number of time increments, and $(\Delta X)_{n+j}$ is the incremental step input added to the sum $(\Sigma \Delta X)_{n+j-1}$ at the time instant $t_{n+j}$.

It will simplify the following equations if a distinction is made between system error at the time instant $t_{n+m}$ with and without additional incremental input steps $(\Delta X)$ after the time instant $t_n$. With additional incremental input steps $(X)$, system error and its derivatives are denoted by $$E_{n+m}^{(0)}, E_{n+m}^{(1)} \cdots E_{n+m}^{(y)}$$

and without additional incremental input steps by $$F_{n+m}^{(0)}, F_{n+m}^{(1)} \cdots F_{n+m}^{(y)}$$

where "$m$" again denotes the total number of time increments, the superscript "$y$" denotes the $y$th derivative, and $E^{(0)}$ is $E$. $U_t$ denotes the unit response of the air frame to a unit step input $(\Delta X)_t$. If at the time instant $t_n$ the quantities of system error $$F_{n+m}^{(1)}, F_{n+m}^{(1)} \cdots F_{n+m}^{(y)}$$

were predicted for an air frame which can be represented by a series of linear differential equations, the general equation:

(2) $$E_{n+m}^{(i-1)} = F_{n+m} + \sum_{j=1}^{m} (\Delta X)_{n+m-j} U_j^{(i-1)}$$

applies where "$m$" again denotes the total number of time increments, the superscript "$i$" denotes a variable from 1 to the $y$th derivative, and $U_j$ is the same as $$U(t_{n+m} - t_{n+m-j})$$

If at time instant $t_n$:

(3) $$E_{n+m} = A_1$$

is required where "$m$" again denotes the total number of time increments, "$i$" again denotes a variable from 1 to $y$, "$y$" is less than or equal to $p+1$, "$p$" is the order of the differential equation of the system, and $A_i$ is a constant variable, Equation 2 is solved for the necessary incremental input steps $(\Delta X)_n, (\Delta X)_{n+1} \cdots (\Delta X)_{n+m-1}$. To illustrate this solution, consider a simple dynamic system whose La Place transfer function is $$\frac{1}{T_1 S + 1}$$

initially at rest.

Suppose the desired response is of a magnitude A. Then applying the transfer function:

(4) $$U_j = 1 - e^{\frac{-jT}{T_1}}$$

and (5) $$U_j^{(1)} = \frac{1}{T_1} e^{\frac{-jT}{T_1}}$$

where "$T$" is a sampling interval and "$e$" is the base of the natural logarithm.

Suppose it is desired to maintain a zero error at the end of each sampling interval T, Equation 3 then becomes:

(6) $$A_1 = 0 + (\Delta X)_0 U_1$$

since $n=0$, $m=1$, $i=1$, $j=1$, $E_1^{(0)} = A_1$, and $F_1^{(0)} = 0$, then:

(7) $$(\Delta X)_0 = \frac{A_1}{1 - e^{T/T_1}}$$

Suppose the system is required to maintain the desired response from a position of equilibrium for a time interval "$t$" equal to two sampling periods 2T where $t_0 = 0$. Equation 3 then becomes:

(8) $$A_1 = 0 + (\Delta X)_0 U_2 + (\Delta X)_1 U_1$$

(9) $$0 = 0 + (\Delta X)_0 U_2^{(1)} + (\Delta X)_1 U_1^{(1)}$$

Since $n=0$, $m=2$, $E_1^{(0)} = E_1$, $E_1^{(1)} = 0$, $F_1^{(0)} = 0$, then;

(10) $$(\Delta X)_0 = \frac{A_1}{1 - e^{T/T_1}}$$

and

(11) $$(\Delta X)_1 = \frac{A_1 e^{-T/T_1}}{1 - e^{T/T_1}}$$

The solution requires the knowledge of the normal response; the predicted and actual system errors, and their derivatives for time $t$, where "$t$" equals a single sampling period T and two sampling periods 2T.

The quantities of the system unit response and the derivatives $U_1$, $U_1^{(1)}$, $U_2$, $U_2^{(1)}$, etc., can be determined in the following manner. Suppose at the time instant $T_{n-1}$ a set of incremental input steps $(\Delta X)_{n-m-j}$ are computed, the value of "$j$" being from 1 to $m$, on the basis of incorrect values of $U_j^{(i-1)}$, where "$i$" is a variable from 1 to $y$ and the value of "$j$" is from 1 to $m$. At the time instant $t_n$, the error and its derivative $E_n$, $E_n^{(1)}$, etc., are measured. The correct values of the system unit response and its derivative must be given by:

(12) $$U_1^{(i-1)} = \frac{E_n^{(i-1)} - F_n^{(i-1)}}{(\Delta X)_{n-1}}$$

where "$i$" again is a variable derivative from 1 to $y$, and $(\Delta X)_{n-1}$ is not zero. Using Equation 12 at the time instant $t_{n+m}$, the unit response is computed by:

(13) $$U_m^{(i-1)} = \frac{E_{n+m}^{(i-1)} - F_{n+m}^{(i-1)} - \sum_{j=1}^{} (\Delta X)_{n+m-j} U_j^{(i-1)}}{(\Delta X)_n}$$

where "$i$" again is a variable derivative from 1 to $y$, and "$m$" goes from 1 to M.

The following description is concerned with the successive reduction of only system error. If control of error derivatives included in the foregoing discussion were required, implementation techniques similar to those to be discussed would be used in the pertinent computations. It should be realized that the predicted error $\bar{E}_{n+1}$ is derived from $F_n$ which is the same as $\bar{E}_n$. Accordingly all of the symbolic representations have now been identified and mathematically derived with the exception of the variable, system gain $K_d$. Gain $K_d$ is adjusted in the controller 10 to negate the variation of the normal unit response $U_1$ of the air frame due to changing flight conditions and may be computed as:

(14) $$K_d = \frac{C_1}{U_1}$$

where C is a constant that is assumed to be $-1$ in the following descriptions. Since $E_n$, $\bar{E}_n$, and $(\Delta X)_{n-1}$ are known, using Equations 12 and 14 $K_d$ is computed by:

(15) $$K_d = \frac{(\Delta X)_{n-1}}{\bar{E}_n - E_n}$$

and the desired system gain $K_d$ is obtained when:

(16) $$K_d(\bar{E}_n - E_n) = (\Delta X)_{n-1}$$

at the time instant $t_n$.

Referring to FIGURE 2, the controller 10 is comprised of seven major circuits, namely, input and output sampler-and-hold circuits 12 and 14 utilizing capacitive memory devices, a logic circuit 13, a null detector 15, a gain computer 16, a programmer 18, and a compute/no compute gate 19. As may be seen by referring to the chart of FIGURE 4, the controller 10 has two similar operating modes, A and B, each having an operating sequence of approximately thirty milliseconds duration. The controller 10 alternates from one mode to the other every hundred milliseconds. The time periods of the modes and the operating intervals thereof are merely illustrative, and it should be understood that there is no intent to define the limits of the invention thereby. The logic circuit 13, in the last two operating intervals of one mode, must satisfy two criteria before the gain computer 16 will operate in the following mode. The first criterion is satisfied when the difference between the absolute value of the predicted errors, for the present and the next sampling periods, less the absolute value of the present predicted error multiplied by a constant $\xi$ is greater than zero, and is symbolized by $|\overline{E}_{n+1}-\overline{E}_n|-\xi|\overline{E}_n|>0$. This criterion validates the predicted signal $\overline{E}_{n+1}$ by indicating a sufficient desired difference between predicted signals $\overline{E}_n$ and $\overline{E}_{n-1}$. The second criterion is satisfied when the absolute value of the predicted error $\overline{E}_{n+1}$ is less than a maximum allowable value and more than a minimum allowable value, and is symbolized by $\overline{E}_{max}>|\overline{E}_{n+1}|>\overline{E}_{min}$. The second criterion is bilateral in that if $\overline{E}_{max}>|\overline{E}_{n+1}|$, signal $\overline{E}_{n+1}$ is below saturation, and if $|\overline{E}_{n+1}|>\overline{E}_{min}$, there is sufficient predicted error for accurately computing a new value of gain $K_d$. It should be noted that the absolute value of the predicted error signals $\overline{E}_{n+1}$ and/or $\overline{E}_n$ are used to satisfy both criteria.

Referring to FIGURES 3 and 4, the controller 10 generally provides a command increment $(\Delta X)_n$ to the rate servo and control actuator (not shown) in the following manner. In mode A, a synchronizing pulse SP from programmer 18 to input and output sampler-and-hold circuits 12 and 14 starts a synchronization interval SI existing from 0 to 10 milliseconds. During the interval SI the input sampler-and-hold circuit 12 has a memory device C1 being charged to the value of the actual error $E_n$ and another memory device C2 being charged to the value of the predicted error at the next sampling period $\overline{E}_{n+1}$. The predicted error signal $\overline{E}_{n+1}$ is also applied to the gain computer 16 which was set during the previous mode, modified by the existing gain $K_d$, and applied to the output sampler-and-hold circuit 14 as $K_d\overline{E}_{n+1}$. The signal $K_d\overline{E}_{n+1}$ is modified by $\rho$, which is the fraction of the error to be corrected, and the resulting signal $\rho K_d\overline{E}_{n+1}$ or $(\Delta X)_n$ is stored in a memory device C5 in circuit 14. All memory of information is achieved in the input and output sampler-and-hold circuits 12 and 14 by memory devices shown as capacitors in the preferred embodiment. Equivalent devices can be substituted as long as they are capable of receiving and storing information without deterioration by future use. The controller 10 remains at a null from 10 to 11 milliseconds until the programmer 18 starts a command transfer interval CTI with a command transfer pulse CTP applied to the output sampler-and-hold circuit 14.

From 11 to 13 milliseconds in response to the command transfer pulse CTP, the memorized command increment $(\Delta X)_n$, applied to the output sampler-and-hold circuit 14 during the synchronizing period SI, is transferred to the rate servo and control actuator 7a and summed with prior command increments to provide the signal $(\Sigma\Delta X)_n$. The control surface command $\delta ec$ applied to the air frame represents the sum of the command increments $(\Sigma\Delta X)_n$. The command transfer interval CTI is the only period during both operating modes which must be held as closely invariant as possible from one mode to the other. This is required because the rate servo is responsive to the value of each command increment $(\Delta X)_n$ and its transfer time. At 13 milliseconds, the command transfer interval CTI terminates and the controller 10 returns to a null state.

At 16 milliseconds, a compute pulse CP1 from the programmer 18 enters circuits 12 and 14, allowing gate 19 to start the compute interval CI. Circuit 12 now supplies the previously predicted error signal $\overline{E}_n$ and the actual error signal $E_n$ to the gain computer 16 where they are summed and modified by system gain $K_d$ to derive a signal $K_d(\overline{E}_n-E_n)$ that is applied to the null detector circuit 15. Simultaneously, circuit 14 transfers the control signal increment $(\Delta X)_{n-1}$ of the previous mode to circuit 15 where the signals $K_d(\overline{E}_n-E_n)$ and $(\Delta X)_{n-1}$ are summed. Gate 19 which was qualified during the compute criterion intervals $CCI_a$ and $CCI_b$, passes the compute pulse CP1 to the null detector circuit 15 and the gain computer 16. The computer 16 has a digital counter 63 (see FIGURE 3) which is set by compute pulse CP1, and a delay network 64 which provides a delayed compute pulse CP2 to qualify gate means 72. The programmer 18 provides timing pulses TP to the counter 63 of the computer 16 simultaneously with the compute pulse CP1. The timing pulses TP are passed by the qualified gate means 72 to operate the counter 63 and modify the value of $K_d$. When the value of $K_d$ is such that the sum of the signals $$K_d(\overline{E}_n-E_n)-(\Delta X)_{n-1}=0$$

the null detector 15 will generate a stop compute pulse SCP which is applied to the computer 16 to maintain the value of gain $K_d$ constant. The stop compute pulse SCP is always generated prior to 25 milliseconds, from the beginning of each mode, and terminates the compute interval CI.

At 25 milliseconds, programmer 18 starts the first compute criterion interval $CCI_a$ by applying compute criterion pulse CCP1 to circuit 12 and to gate 19. In response to pulse CCP1, circuit 12 sums the memorized error signals $\overline{E}_{n+1}$ and $\overline{E}_n$ which is transmitted to logic circuit 13 simultaneously with transmission of memorized signal $\overline{E}_n$ by itself. The logic circuit 13 modifies the sum of signals $\overline{E}_{n+1}-\overline{E}_n$ by the constant $\xi$, and derives its absolute value at the same time the absolute value of signal $\overline{E}_n$ is derived. The two derived absolute value signals are summed to provide a signal $L_d$ that is simultaneously applied with the compute criterion pulse CCP1 to partially qualify gate 19 only if the signal $L_d$ satisfies the compute criterion $|\overline{E}_{n+1}-\overline{E}_n|-\xi|\overline{E}_n|>0$.

At about 28 milliseconds, programmer 18 stops compute criterion interval $CCI_a$, and with a second compute criterion pulse CCP2 starts a second compute criterion interval $CCI_b$, that is terminated at 30 milliseconds, by applying a compute criterion pulse CCP2 to circuit 12 and to gate 19. In response to pulse CCP2, the memorized signal $\overline{E}_{n+1}$ is transferred from circuit 12 to the logic circuit 13 where its absolute value is derived and compared to an allowable maximum value $\overline{E}_{max}$ and minimum value $\overline{E}_{min}$, to provide $L_{m1}$ and $L_{m2}$. Signals $L_{m1}$ and $L_{m2}$ are simultaneously applied with pulse CCP2 to gate 19. If gate 19 has been partially qualified by signal $L_d$, the gate will be fully qualified if the signals $L_{m1}$ and $L_{m2}$ satisfy the second criterion $\overline{E}_{max}>|\overline{E}_{n+1}|>\overline{E}_{min}$. Referring specifically to FIGURE 4, the charted pulses SP, CTP, CP1 and CCP1 and CCP2 control various diode gates listed below the time line in the associated operating intervals. Mode B is the same as mode A except that alternate memory devices are used to retain signals $\overline{E}_{n+1}$ in circuit 12, and $\rho K_d\overline{E}_{n+1}$ or $(\Delta X)_n$ in circuit 14.

In the controller 10 as shown in FIGURE 3, the input sampler-and-hold circuit 12 has signal lines 20 and 21 which receive the actual error signal $E_n$ and the predicted error signal $\overline{E}_{n+1}$, respectively. The line 20 includes a pair of series connected diode gates G1 and G2 and a capacitor or memory device C1 connected between the gates and to a point of zero potential. All of the diode gates identified in this description by a number having a prefix G may be of the character shown and described in the copending U.S. patent application Serial No. 25,376 of Hartog and Moreines, filed April 28, 1960, and now abandoned, and assigned to the same assignee as the present application. Line 21 includes a diode gate G3, and a pair of capacitor memory devices C2 and C3 connected to the output of gate G3, and to a point of zero potential by diode gates G4 and G5, respectively. The input of a diode gate G6 is connected between capacitor C2 and gate G4, and has its output connected to the output of a diode gate G7 that has its input connected between capacitor C3 and gate G5.

The logic circuit 13 has a pair of phase insensitive demodulators or comparable networks 30 and 31 for deriving the absolute values of signals applied thereto. The input of network 30 is connected to line 21 at the output of gate G3, and the input of network 31 is connected to the interconnected outputs of gates G6 and G7 by a potentiometer 32 which modifies signals to the network 31 by an amount representative of the constant $\xi$ to provide a signal $(\bar{E}_{n+1} - \bar{E}_n) 1/\xi$ to the network 31. The outputs of networks 30 and 31 are connected to a summing means 33 having its output connected to gate 19 for transmitting signals $L_d$. The output of network 30 is also connected to summing means 34 connected to signal source 36 which provides a signal $\bar{E}_{max.}$ representing the maximum allowable value of the predicted error signal $\bar{E}_{n+1}$, and to summing means 35 connected to signal source 37 which provides a signal $\bar{E}_{min.}$ representing the minimum allowable value. The outputs of summing means 34 and 25 are connected to gate 19 for transmitting signals $L_{m1}$ and $L_{m2}$, respectively.

The sampler-and-hold circuit 14 has an input line 40 connected to the computer 16 for receiving a signal $K_d\bar{E}_{n+1}$ during the synchronization interval SI, and an output line 41 for transferring the command increment $(\Delta X)_n$ to the rate servo and actuator 7a during the command transfer interval CTI. The input line 40 includes a potentiometer 42 to modify signal $K_d\bar{E}_{n+1}$ by $\rho$, and is connected to the output line 41 by a pair of series connected diode gates G8 and G9. A pair of capacitors C4 and C5 are connected to the connection between gates G8 and G9, and to a point of zero potential by diode gates G10 and G11, respectively.

The connection between gates G8 and G9 is also connected to a summing means 50 of the null detector circuit 15 to provide a signal $(\Delta X)_{n-1}$ during the compute interval CI. The output of summing means 50 is connected to the input of a diode gate G12 controlled by a flip flop FF1, and whose output is connected to a flip flop FF2 by an amplifier 51. All of the flip flops discussed in this description are transistorized bistable multivibrator devices and are identified by numbers having prefixes FF. Flip flops are generally well-known in the art, and typical circuits are shown and described in chapter 5, pages 140 to 173 of the book entitled "Pulse and Digital Circuits," written by J. Millman and H. Taub and published in 1956 by McGraw-Hill Book Co., Inc. of New York, New York. Flip flop FF2 has two output lines 52 and 53 including R.C. networks 56 and 57, respectively, with negative-transmitting diodes 58 and 59 connected to the junctions of the associated capacitors and resistors of the networks. The diodes 58 and 59 connect lines 52 and 53, respectively, in parallel to a line 54 connected to the computer 16 and the "reset" connection of flip flop FF1.

The null detector circuit 15 is a zero crossover switch arrangement which generates a stop compute pulse SCP when the sum of signals $K_d(\bar{E}_n - E_n)$ from computer 16 and $(\Delta X)_{n-1}$ from circuit 14 is equal to zero. This is accomplished in the following manner. With a signal $K_d(\bar{E}_n - E_n) - (\Delta X)_{n-1}$ present at the input of flip flop FF2, one of the lines 52 or 53 is at a positive potential and the other at a negative potential. The capacitors of networks 56 and 57 pass a pulse when a direct voltage is applied thereto while each of the diodes 58 and 59 blocks only positive pulses. When the signal applied to the input of flip flop FF2 changes polarity, the potentials of the output lines 52 and 53 reverse and the one line that goes from positive to negative provides a negative going stop compute pulse SCP to line 54 to reset flip flop FF1 and stop the computer 16, as will be further discussed.

The computer 16 has a summing means 60 connected to an amplifier 61 and is adapted to receive signals from lines 20 and 21 of sampler-and-hold circuit 12. An output line 62 of the amplifier 61, including a pair of series connected resistors R1 and R2, is connected to the input line 40 of circuit 14 and to the summing means 50 of circuit 15. A pair of resistors R3 and R4 are connected to line 62 between resistors R1 and R2, and to a point of zero potential by diode gates G13 and G14, respectively. A resistor R5 is connected to line 62 between resistor R2 and the connection of line 62 to line 40 and to a point of zero potential by a diode gate G15. A shunt resistor R6 also connects resistor R5 to a point of zero potential. The diode gates G13, G14 and G15 are controlled by a digital counter 63, and with resistors R1 to R6 comprise a variable voltage divider network or step attenuator for computing the value of the system gain $K_d$ and for modifying signals received from circuit 12 by that computed gain value.

The digital counter 63 is comprised of cascaded flip flops FF3, FF4 and FF5 which control diode gates G13, G14 and G15, respectively, in response to timing pulses TP during the compute interval CI. The flip flops FF3, FF4 and FF5 are interconnected by lines 70 and 71 so that flip flop FF4 is triggered when flip flop FF3 goes from 1 to 0, and flip flop FF5 is triggered when flip flop FF4 goes from 1 to 0. The counter 63 also includes an AND gate 72 which is connected to the trigger of flip flop FF3 and passes timing pulses TP, from the output line 80 of the programmer 18, when it is qualified by a voltage from the output line 65 of a flip flop FF6 in the computer 16. An output line 90 from gate 19 transmits the pulse CP1 and is connected to the "reset" connection of flip flops FF3, FF4 and FF5, the "set" connection of flip flop FF1, and the "set" connection of flip flop FF6 by a delay network 64. The compute pulse CP1 is applied to network 64 at the same time it resets the flip flops FF3, FF4 and FF5 simultaneously with the first timing pulse TP applied to AND gate 72. The network 64 applies a delayed compute pulse CP2, in response to pulse CP1, to set flip flop FF6 and provide qualifying voltage to AND gate 72 after the first timing pulse TP is blocked to insure the setting of flip flops FF3, FF4 and FF5 before they are triggered.

To vary the value of gain $K_d$, the transmitting states of gates G13, G14 and G15 are altered to predetermined patterns by flip flops FF3, FF4 and FF5, respectively. The value of gain $K_d$ is 1.000 when gates G13, G14 and G15 are not transmitting because flip flops FF3, FF4 and FF5 are in the 0 state, and is incrementally stepped down through values .616, .380, .232, .146, .089, and .055 to .000 when all three gates are transmitting because all three flip flops are in state 1. This may be better understood by referring to FIGURE 5 which is a chart of the gates G13, G14 and G15 and their associated flip flops FF3, FF4 and FF5. When a 0 state is present, the flip flop is "reset" and the associated gate does not transmit. Conversely, when a 1 state is present, the flip flop is "set" and allows the associated gate to transmit.

The programmer 18 is a pulse generator which may be of the character shown and described in copending U.S. patent application Serial No. 806,625 of A. S. Robinson, filed April 15, 1959, and assigned to the same assignee as the present application. There are many and varied pulse generators for providing programmed pulses which may be used as the programmer 18 in place of the device of the copending application. It should suffice to say that the programmer 18 as indicated in FIGURE 4, provides timing pulses TP to the AND gate 72 by its output line 80; compute pulses CP1 to gate 19 by its output line 81; synchronizing pulses SP, command transfer pulses CTP, and compute criterion pulses CCP1 and CCP2 to the various gates G1 to G8 by lines 84; synchronizing pulses SP, command transfer pulses CTP and compute pulses CP1 by output lines 85; and the compute criterion pulses CCP1 and CCP2 also to gate 19 by lines 82 and 83, respectively.

Referring now to FIGURE 6 the compute/no compute gate 19 has two AND gates 91 and 92 with their outputs connected to the "set" side of respective flip flops FF7 and FF8 that, in turn, have their respective outputs 94 and 95 both connected to an AND gate 97. The "reset" sides of flip flops FF7 and FF8 are connected to line 81 providing compute pulses CP1, via an R.C. delay circuit 98, which delays pulse CP1 and applies it as a delayed compute pulse CP3. Line 81 is also connected to AND gate 97. During the compute criterion interval $CCI_a$, signal $L_d$, and pulse CCP1 from line 82 are applied to qualify AND gate 91, and apply a pulse to set flip flop FF7 and thus provide a voltage to AND gate 97. During the compute criterion interval $CCI_b$, pulse CCP2 is applied to AND gate 92 from line 83, which simultaneously receives and is qualified by signals $L_{m2}$ and $L_{m1}$. The qualified gate 92 applies a pulse to set flip flop FF8 and provide voltage to AND gate 97. With voltage from both flip flops FF7 and FF8, the AND gate 97 is qualified to pass a compute pulse CP1 when it is applied thereto by line 81 during the compute interval CI. The compute pulse CP1 is simultaneously applied by line 81 via R.C. network 98 as a delayed pulse CP3 to "reset" flip flops FF7 and FF8.

If both flip flops FF7 and FF8 are not "set" by qualifying signals $L_d$, $L_{m1}$ and $L_{m2}$, the gate 97 will not be qualified and no compute pulse CP1 will be transmitted by gate 19. However, the delayed compute pulse CP3 across network 98 will "reset" either flip flop FF7 or FF8 that was previously "set."

The novel self-adaptive control system operating in a vehicle in flight receives a signal from the vertical gyro 7c, manual control 7d or other means to provide a commanded rate signal $\theta_c$ that is applied to the model 8 to derive a desired response signal $\theta_m$. The desired response signal $\theta_m$ is summed with an indicated rate of change of attitude signal $\theta$, from the rate gyro 7b, in the predictor 9 to obtain an actual present error signal $E_n$ which is presented to the self-adaptive controller 10 by the line 20. As previously described, the predictor 9 also utilizes the actual error signal $E_n$ to compute the predicted error signal $\bar{E}_{n+1}$ which is presented to the self-adaptive controller 10 by line 21.

At the beginning of each mode A, the programmer 18 provides a synchronizing pulse SP to open diode gates G1, G3 and G4 in the input sampler-and-hold circuit 12, and gates G8 and G11 in the output sampler-and-hold circuit 14. The synchronizing pulse SP starts the synchronizing interval SI in mode A that terminates at 10 milliseconds. With diode gate G1 transmitting, line 20 provides the actual error signal $E_n$ to charge capacitor C1. With diode gates G3 and G4 transmitting, line 21 provides the predicted error signal $E_{n+1}$ to charge capacitor C2, and simultaneously applies the signal to summing means 60 of the gain computer 16. The predicted error signal $\bar{E}_{n+1}$ is transmitted by the amplifier 61 from the summing means 60 to line 62 with its associated resistors R1 to R6 where it is modified by the computed gain $K_d$ and applied to line 40 of the output sampler-and-hold circuit 14. Line 40 includes a potentiometer 42 for modifying the signal $K_d\bar{E}_{n+1}$ according to $\rho$, the fraction of error to be corrected, and with diode gates G8 and G11 transmitting, signal $\rho K_d\bar{E}_{n+1}$ or $(\Delta X)_n$ charges capacitor C5. At 10 milliseconds, the end of the synchronizing interval SI, diode gates G1, G3, G4, G8 and G11 close and charged capacitors C1, C2 and C5 hold signals $E_n$, $\bar{E}_{n+1}$, and $\rho K_d\bar{E}_{n+1}$ or $(\Delta X)_D$, respectively.

The self-adaptive controller 10 is at a null from 10 milliseconds to 11 milliseconds when the programmer 18 applies a command transfer pulse CTP to open diode gates G9 and G11 to start the command transfer CTI which terminates at 13 milliseconds. With gates G9 and G11 open, the memorized command increment $\rho K_d\bar{E}_{n+1}$ or $(\Delta X)_n$ is transferred to the rate servo and actuator 7a by output line 41 and summed with previous command increments provides command signal $(\Sigma\Delta X)_n$ to actuate the control surface (not shown) having a response $\delta_{ec}$ equal to signal $(\Sigma\Delta X)_n$. The air frame 7 responds to the new command $(\Sigma\Delta X)_n$, and the rate and vertical gyros 7b and 7c provide modified signals $\theta$ and $\Delta\theta$, respectively. The duration of the command transfer interval CTI must be maintained as closely invariant as possible from one mode to another because the rate servo and its associated control actuator are responsive to both the value and the duration of the command increment $(\Delta X)_n$.

The self-adaptive controller 10 is at a null from 13 milliseconds to 16 milliseconds when the programmer 18 applies a compute pulse CP1 to open diode gates G2 and G5 in circuit 12 and G10 in circuit 14. The compute pulse CP1 is simultaneously applied to the compute/no compute gate 19 that was qualified during the compute criterion intervals $CCI_a$ and $CCI_b$ of the previous mode to pass the compute pulse CP1 through line 90 to the null detector circuit 15 and the computer 16 to start the compute interval CI. Capacitor C3 was charged by the predicted error signal $\bar{E}_{n+1}$ during the previous mode, therefore, this memorized signal in the present mode is $\bar{E}_n$. With gates G2 and G5 open, the actual error signal $E_n$ retained by capacitor C1 and the predicted error signal $\bar{E}_n$ retained by capacitor C3 are transferred to and summed by means 60. The summed signal $\bar{E}_n - E_n$ is applied by the amplifier 61 to line 62 with its associated resistor R1 to R6 where it is modified by the computed gain $K_d$. The resulting signal $K_d(\bar{E}_n - E_n)$ is applied to summing means 50 of null detector circuit 14. With gate 10 of circuit 14 open, the command increment $(\Delta X)_n$ of the previous mode that is retained by capacitor C4, now $(\Delta X)_{n-1}$, is transferred to means 50 where it is summed with signal $K_d(\bar{E}_n - E_n)$ to provide a resulting signal $K_d(\bar{E}_n - E_n) - (\Delta X)_{n-1}$.

Simultaneously, the compute pulse CP1, passed by gate 19 is applied to reset flip flops FF3, FF4, and FF5 of the counter 63, and to set flip flop FF1 of circuit 15 to open gate G12. With gate G12 open signal $$K_d(\bar{E}_n - E_n) - (\Delta X)_{n-1}$$

is transmitted to the flip flop FF2 through amplifier 51. Compute pulse CP1 applied from programmer 18 to gate 19 by line 81 is also applied to the delay network 98 which provides the delayed compute pulse CP3 to reset flip flops FF7 and FF8 to eliminate the qualification of gate 19. Line 90 also applies compute pulse CP1 to the delay network 64 which applies the delayed pulse CP2 to set flip flop FF6 and provides qualifying voltage to AND gate 72. At 16 milliseconds when programmer 18 provided compute pulse CP1, it started providing timing pulses TP to its output line 80 which were blocked by the AND gate 72 until it was qualified by voltage from flip flop FF6 in response to the delayed pulse CP2. This delay prevented the flip flops FF3, FF4 and FF5 from being triggered in response to timing pulses TP before they were completely set by compute pulse CP1.

Flip flop FF3 alternates between a 0 and 1 state in response to timing pulses TP passed to its trigger by qualified AND gate 72. Flip flop FF4 is responsive to pulses from line 70 when flip flop FF3 goes from its 1 to 0 state and therefore is responsive to every second timing pulse TP. Similarly, flip flop FF5 is responsive to pulses from line 71 each time flip flop FF4 goes from its 1 to 0 state and therefore is responsive to every fourth timing pulse TP. Varying the transmitting state of diode gates G13, G14 and G15 by the flip flops FF3, FF4 and FF5 of counter 63 varies the amount of gain $K_d$ provided by the voltage divider network or step attenuator of computer 16. When the value of gain $K_d$ is such that the signal $K_d(\overline{E}_n - E_n) - (\Delta X)_{n-1} = 0$ at the flip flop FF2, the polarities of the flip flop output lines 52 and 53 reverse, and the negative going line with its associated R.C. network and diode passes a stop compute SCP to line 54. The stop compute pulse SCP is applied to reset flip flop FF1 and to close gate G12, and to simultaneously reset flip flop FF6 to terminate the qualifying voltage applied to the AND gate 72. When the voltage to AND gate 72 is terminated, the timing pulses TP from the programmer 18 are blocked and the gain computer 16 with its digital counter 63 comes to rest. The end of the compute interval CI is determined by the stop compute pulse SCP which is always generated prior to 25 milliseconds.

In response to the stop compute pulse SCP, the controller 10 comes to rest until 25 milliseconds when programmer 18 starts the first compute criterion interval $CCI_a$ by applying compute criterion pulse CCP1 to open diode gates G5 and G6 of circuit 12, and to AND gate 91 of compute/no compute gate 19. With gates G5 and G6 open, memorized signals $\overline{E}_{n+1}$ from capacitor C2 and $\overline{E}_n$ from capacitor C3 are summed and applied to potentiometer 32 and modified by the constant $\xi$ to derive a signal $(\overline{E}_{n+1} - \overline{E}_n) 1/\xi$ which is applied to the absolute value network 31. Simultaneously, memorized signal $\overline{E}_n$ from capacitor C3 is applied directly to the absolute value network 30. The output $|\overline{E}_{n+1} - \overline{E}_n| 1/\xi$ of network 31 is summed with the output $|\overline{E}_n|$ of network 30 by means 33 and the resulting signal $L_d$ is passed by AND gate 91, simultaneously receiving pulse CCP1, to set flip flop FF7 and partially qualify AND gate 97 of gate 19 if the signal $L_d$ satisfied the criterion $|\overline{E}_{n-1} - \overline{E}_n| - \xi|\overline{E}_n| > 0$.

Programmer 18 starts the second compute criterion interval $CCI_b$ at about 28 milliseconds by applying compute criterion pulse CCP2 to open diode gate G4, and to partially qualify AND gate 92 of gate 19. With gate G4 open, memorized signal $\overline{E}_{n+1}$ retained in capacitor C2 is transferred to network 30 to derive absolute signal $|\overline{E}_{n+1}|$ that is applied to means 34 and 35, and summed with the maximum allowable signal $\overline{E}_{max.}$ from source 36 to provide signal $L_{m1}$ and the minimum allowable signal $\overline{E}_{min.}$ from source 37 to provide signal $L_{m2}$. Signals $L_{m1}$ and $L_{m2}$ are applied simultaneously with compute criterion pulse CCP2 to qualify AND gate 93, if the signals satisfy the criterion $\overline{E}_{max.} > |\overline{E}_{n+1}| > \overline{E}_{min.}$. It should be realized that a similar qualification of gate 19 to pass the compute pulse CP1 to start the compute interval CI in the present mode A was provided during the compute criterion intervals $CCI_a$ and $CCI_b$ of the previous mode. The second compute criterion interval $CCI_b$ terminates at 30 milliseconds and the self-adaptive controller 10 remains at null until 100 milliseconds, at which time mode B starts.

Mode B is the same as mode A except that alternate capacitors are charged with and retain information. During the synchronizing interval SI of mode A, capacitors C2 and C5 were charged to the value of signals $\overline{E}_{n+1}$ and $(\Delta X)_n$, respectively, which are $\overline{E}_n$ and $(\Delta X)_{n-1}$ in the present mode B. In the present mode, capacitors C3 and C4 are charged by and retain signals $\overline{E}_{n+1}$ and $(\Delta X)_n$, respectively. Accordingly, during the remaining intervals of mode B, alternate diode gates are opened to provide desired memorized information as may be clearly seen by comparing charts of modes A and B of FIGURE 4. It should be readily visualized that with the self-adaptive control system as herein described, by predicting the error for the following sampling instant and by utilizing the difference between the actual and predicted error signals as compared to the last control increment, a system gain $K_d$ may be computed to provide a self-sufficient, accurate and self-adaptive control system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A self-adaptive control system using sampled data at discrete instances to derive and apply command increment signals to control a device with means for providing signals representing the actual response and the rate of change of response of the device to the increment signals, comprising means for deriving a signal representing a desired response from the actual response signal, means for comparing the signals representing desired response and rate of change of response to derive signals representing the actual error at the present and a predicted error at a predetermined future instant in the absence of command increment signals between the present and the future instant, and a controller receiving the error signals to derive a command increment signal by modifying the signal representing the predicted error at the future instant by a computed system gain that is applied to control the device, said controller including means for comparing a system gain modified sum of signals representing the actual and predicted errors at the present to a previous command increment signal to compute system gain.

2. A controller having a repetitive operating sequence for a self-adaptive control system that provides a signal representing an actual error between the actual response and the desired response at the present to a command increment signal provided during the previous sequence and a signal representing a predicted error between a predicted response and the desired response at the next sequence in the absence of a command increment signal during the present sequence, comprising an input circuit adapted to receive the error signals having means to sample the signals during each sequence, the means sampling the actual error holding the sampled signal until sampling during the next sequence, the means sampling the predicted error signal holding two consecutive predicted error signals each for two sequences so signals representing predicted errors at the present and the next sequence are available in the input circuit, a computer circuit for computing system gain during each sequence having a network for modifying the signal representing the predicted error at the next sequence by a computed gain to derive a command increment signal, an output circuit for transmitting command increment signals having means for sampling the command increment signal during each sequence, the means sampling command increment signals holding two consecutive increment signals each for two sequences so command incrment signals for the present and the previous sequence are available in the output circuit, the computer circuit computing a new system gain in response to a compute control signal when a gain modified difference between the actual and predicted error signals at the present and the command increment signal of the previous sequence are unequal, and a programmer providing control signals to sequence the operation of the circuits.

3. The controller according to claim 2 in which the means for sampling and holding signals in the input and output circuits comprise devices adapted to hold a voltage level, and solid state diode gates opening and closing in response to control signals from the programmer for transferring voltage levels between the voltage level holding devices and the associated circuits.

4. The controller according to claim 2 having a null detector circuit comprising means for comparing the gain modified difference between the signals representing the actual and predicted errors at the present to the command increment signal of the previous sequence in response to a compute control signal from the programmer, and means for generating a stop compute control signal that is applied to the computer when the compared signals become equal in response to the changing system gain.

5. The controller according to claim 4, the computer comprising the signal modifying network being an adjustable voltage divider network having a signal transmitting resistance line and a plurality of shunt resistors, a solid state diode gate connected to each of the shunt resistors for connecting an associated resistor to a point of zero potential when the gate is open, a digital counter having a plurality of cascaded flip flops with their outputs singularly connected to the diode gates, each flip flop having a 0 state to close an associated gate and a 1 state to open the associated gate to connect an associated shunt resistor to a point of zero potential, a flip flop passing a qualifying voltage in response to the compute control signals and to block the qualifying voltage in response to the stop compute control signals, and an AND gate for passing timing pules from the programmer to the counter when qualified by the qualifying voltage to alter the states of the flip flops of the counter varying the connections of the shunt resistors to zero potential that varies the value of the network that represents system gain.

6. The controller according to claim 4 having a gate for passing a compute control signal from the programmer to the computer and null detector circuits when qualified, and a logic circuit for qualifying the gate when the difference between the two predicted error signals held in the input circuit indicates that the signal representing the predicated error at the next sequence is valid and the valid signal is below saturation and sufficient for computing system gain.

7. A self-adaptive control system using sampled data at discrete instances to derive and apply command increment signals to control a device with means for providing signals representing the actual response and the rate of change of response of the device to the increment signals, comprising means for deriving a signal representing a desired response from the actual response signal, means for comparing the signals representing desired response and rate of change of response to derive signals representing the actual error at the present and a predicted error at a predetermined future instant in the absence of command increment signals between the present and the future instant, and a controller receiving the error signals to derive a command increment signal by modifying the signal representing the predicted error at the future instant by a computer system gain that is applied to control the device, said controller including means for comparing a system gain modified sum of signals representing the actual and predicted errors at the present to a previous command increment signal to compute system gain, said controller further comprising a first circuit adapted to receive the error signals having means for sampling the signals and holding the sampled signals, a second circuit for applying the command increment signals to the control means having means for sampling the increment signals and holding the sampled signals, a computer circuit for deriving signal gain after the error and command increment signals are sampled having a network for modifying the error signals by the computed gain, and a programmer providing control pulses to sequence the operation of the circuits of the controller, said controller further including a detector circuit for generating a stop compute pulse that is applied to the computer circuit to stop computing system gain when the difference between the compared gain modified sum of the signals representing the actual and predicted errors at the present and the command increment signal at a prior instant becomes zero, and a gate connected to pass a start compute pulse from the programmer to the computer and detector circuit to start computing system gain, said controller further comprising a logic circuit for providing signals to qualify the gate to pass the start compute pulse when the difference between the signals representing predicted errors at the present and the predetermined future instant validates the signal representing the predicted error at the predetermined future instant and the validated predicted error signal is sufficient for computing system gain and is below saturation.

8. A self-adaptive control system for controlling a device comprising means for providing a signal representing the desired response of said device, means for providing a signal representing the actual response of said device, means responsive to said desired response signal and said actual response signal for providing an error signal, sampling means responsive to said error signal for providing signals representing discrete units of said error signal at specific instants in time, means including a variable gain means responsive to the output from said sampling means for providing discrete command signals to actuate said device, gain adjustment means for adjusting the gain of said variable gain means inversely with the responsiveness of said device to said discrete command signals.

9. Apparatus as defined by claim 8, including logic means operatively connected to said gain adjustment means for preventing a gain adjustment based on data having a substantial percentage of extraneous disturbances associated therewith.

10. Apparatus as defined by claim 8, including logic means operatively connected to said gain adjustment means for preventing a gain adjustment when the effect of past command signals on the present change in response is substantial in comparison to the effect of the discrete command signal provided immediately preceding the present change in response.

11. A self-adaptive control system for controlling a device comprising means for providing a signal representing the desired response of said device, means for providing a signal representing the actual response of said device, control means responsive to said desired response signal and said actual response signal for providing an error signal, sampling means responsive to said error signal for providing signals representing discrete units of said error signal at specific instants in time, control means responsive to a signal output from said sampling means for providing a discrete command signal to actuate said device, said control means including a variable gain means, a digital counter for controlling the gain of said variable gain means, a gain adjustment means for providing count pulses to said counter to incrementally vary the gain of said variable gain means inversely with the response of said device to said command signal.

12. A self-adaptive control system for controlling a device comprising means for providing a signal representing the desired response of said device, means for providing a signal representing the actual response of said device, means responsive to said signals for providing a first error signal representing the difference between the desired and actual response signals predicted to occur at a predetermined future instant, controller means for modifying said first error signal by a computed system gain to provide a command signal to actuate said device to correct for said error, means for providing a second error signal representing the difference between the desired and actual response signals at a present instant, gain adjustment means responsive to said first and second error signals and said command signal for varying the computed system gain inversely with the response of said device to said command signal.

13. Apparatus as defined by claim 12, said controller means including sampling means responsive to said error signal for providing signals representing discrete units of said error signal at specific instants in time.

14. Apparatus as defined by claim 12, said gain adjustment means including a digital counter for controlling the gain of said gain adjustment means.

15. Apparatus as defined by claim 12, including logic means operatively connected to said gain adjustment means for preventing a gain adjustment based on data having a substantial percentage of extraneous disturbances therewith.

16. Apparatus as defined by claim 12 including logic means operatively connected to said gain adjustment means for preventing a gain adjustment when the effect of past command signals on the present change in response is substantial in comparison to said discrete command signals.

17. A self-adaptive control system for controlling a flight vehicle comprising means for providing a signal representing the desired response of said flight vehicle, means for providing a signal representing the actual response of said flight vehicle, means responsive to said signals for providing, at discrete computing intervals, a sampled error signal and a sampled predicted error signal, said sampled error signal representing the difference between the desired and actual response signals, said sampled predicted error signal representing the computed error expected to occur at a predetermined future instant, means for memorizing a sampled predicted error signal computed during a preceding computing interval and representing the computed error expected to occur at the present instant, controller means including variable gain means for modifying said sampled predicted error signal representing the computed error expected to occur at a predetermined future instant by a computed system gain to provide discrete command signals to control said flight vehicle, said controller means including means for memorizing a command signal applied during a preceding computing interval, means for comparing said memorized command signal, said sampled error signal and said memorized predicted error signal for varying the gain of said variable gain means inversely with the responsiveness of said flight vehicle.

References Cited by the Examiner

UNITED STATES PATENTS

| | | | |
|---|---|---|---|
| 2,712,414 | 7/1955 | Ziebolz et al. | 235—151 |
| 2,829,322 | 4/1956 | Silva | 235—151 XR |
| 2,842,311 | 7/1958 | Petrie | 235—151 |
| 3,030,054 | 4/1962 | Lee et al. | 244—77 |
| 3,057,584 | 10/1962 | Bretoi | 244—77 |
| 3,059,880 | 10/1962 | Buxton | 244—77 |

MALCOLM A. MORRISON, *Primary Examiner.*

CORNELIUS D. ANGEL, *Examiner.*